(12) United States Patent
Oeder et al.

(10) Patent No.: US 6,848,303 B2
(45) Date of Patent: Feb. 1, 2005

(54) WATER METER WITH A MEASURING INSERT, SEALED TOWARDS THE OUTSIDE

(75) Inventors: Ottmar Oeder, Herrieden (DE); Walter Klass, Ansbach (DE)

(73) Assignee: Hydrometer GmbH, Ansbach (DE)

( * ) Notice: Subject to any disclaimer, the term of this patent is extended or adjusted under 35 U.S.C. 154(b) by 0 days.

(21) Appl. No.: 10/725,902

(22) Filed: Dec. 2, 2003

(65) Prior Publication Data

US 2004/0206175 A1 Oct. 21, 2004

(30) Foreign Application Priority Data

Feb. 19, 2003 (DE) .......................................... 103 06 873

(51) Int. Cl.[7] .............................................. G01F 15/14
(52) U.S. Cl. ..................................................... 73/273
(58) Field of Search ....................... 73/273, 201, 272 R

(56) References Cited

U.S. PATENT DOCUMENTS

| | | | | |
|---|---|---|---|---|
| 3,068,696 A | * | 12/1962 | Smith et al. | ................... 73/273 |
| 3,563,085 A | * | 2/1971 | Allen | ........................... 73/273 |
| 5,339,686 A | * | 8/1994 | DeJarlais et al. | ............. 73/273 |
| 5,546,801 A | * | 8/1996 | Swinson et al. | ............... 73/273 |

* cited by examiner

Primary Examiner—Harshad Patel
(74) Attorney, Agent, or Firm—Jordan and Hamburg LLP

(57) ABSTRACT

A water meter includes a metal housing which is connectable with a connecting housing through which the water passes and which is disposed in a water pipeline. A plastic measurement insert includes a channel ring upper part, a channel ring lower part and an unpeller mounted therebetween. The metal housing presses the plastic measurement insert onto an outlet opening of the connecting housing. Said plastic measurement insert is seated with its lower edge on a gasket on an opening surrounding the connecting housing to thereby form a seal.

7 Claims, 2 Drawing Sheets

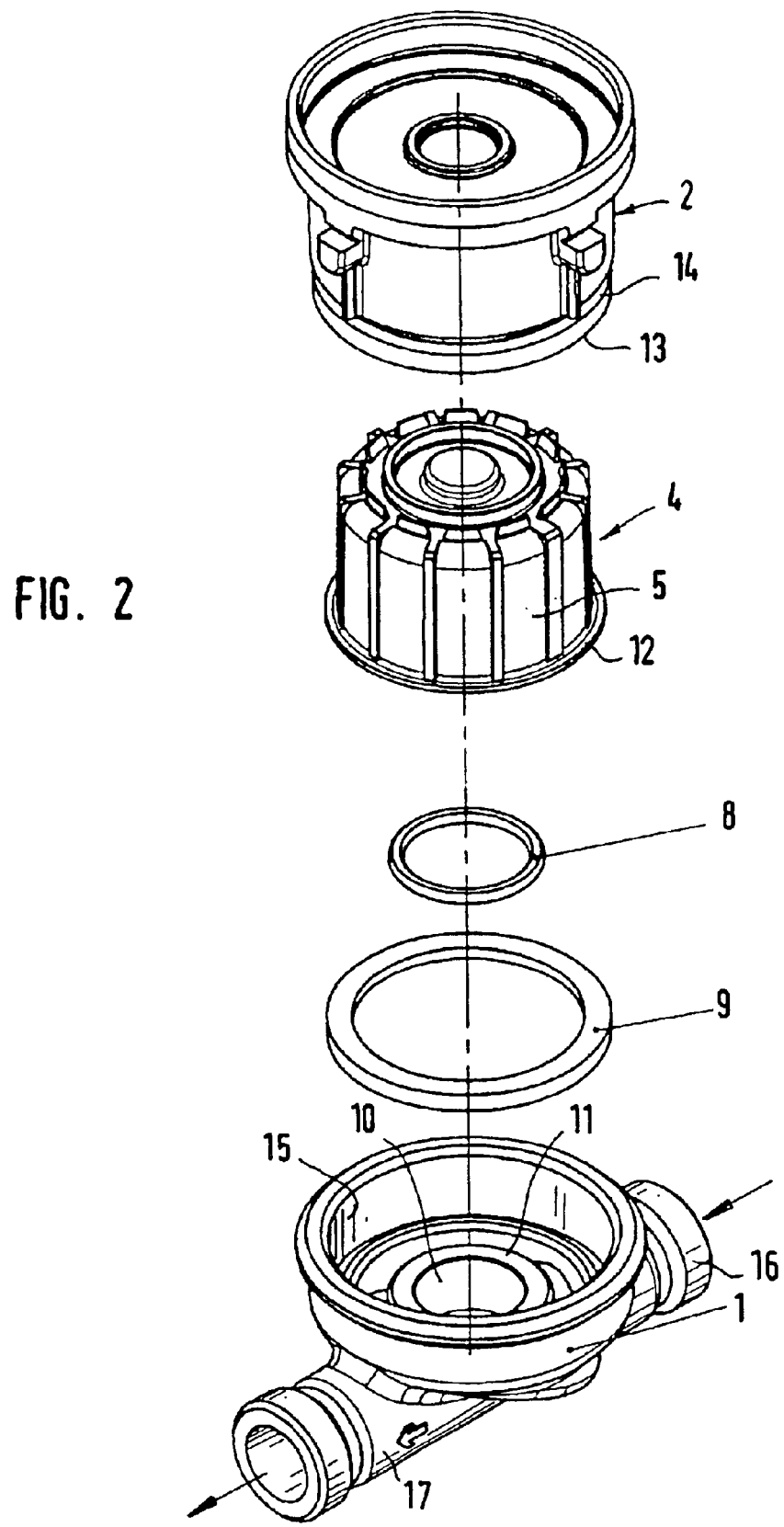

WATER METER WITH A MEASURING INSERT, SEALED TOWARDS THE OUTSIDE

BACKGROUND OF THE INVENTION

The invention relates to a water meter with a metal housing which can be screwed into a connecting housing through which the water passes and which is disposed in a water pipeline. The metal housing presses a measurement insert, consisting of plastic and comprising a channel ring upper part and a channel ring lower part with a vane mounted there between, onto an outlet opening of the connecting housing to thereby form a seal.

Usually such water meters which generally comprise also a screen between the channel ring lower part and the connecting housing are constructed so that the metal housing, while being screwed in, is pressed onto a gasket surrounding the inlet opening of the connecting housing, the metal housing of the measurement insert at the same time pressing on the gasket around the outlet opening of the connecting housing. As a result, however, the entering water also comes into contact with the metal housing so that, even if brass or other materials are used for this purpose, or if surface-coating with chromium or nickel are employed, corrosion cannot be excluded.

SUMMARY OF THE INVENTION

It is therefore an object of the invention to provide a water meter of the type described above so that the danger of corrosion of metal parts of the water meter is avoided.

Pursuant to the invention, this objective is accomplished owing to the fact that the measurement insert, consisting of plastic, is seated with its lower edge on a gasket surrounding the inlet opening of the connecting housing thereby forming a seal.

Due to this inventive configuration, the water-conducting space within the connecting housing and the measurement insert are uncoupled completely from the metal housing, which ensures the contacting pressure of the measurement insert so that the previously existing danger of corrosion is precluded because of the absence of any contact whatsoever of water with metal parts of the water housing.

Preferably, the construction can be such that the channel ring lower part is provided with an outwardly directed contacting-pressure edge flange which embraces the edge of the metal housing. As the metal housing is being screwed into the connecting housing, it presses this edge flange against the gasket which preferably is constructed as a flat gasket, and, simultaneously with that, also presses the outlet section of a channel ring lower part and a screen over a gasket against a sealing surface surrounding the outlet opening of the connecting housing.

Further advantages, distinguishing features and details of the invention arise out of the following description of an example and from the accompanying drawings.

BRIEF DESCRIPTION OF THE DRAWINGS

FIG. 2 shows an exploded representation of the components of such a water meter with the exception of the housing lid, which contains the electronics and can be seated on the metal housing.

DESCRIPTION OF THE PREFERRED EMBODIMENTS

Figure 1:
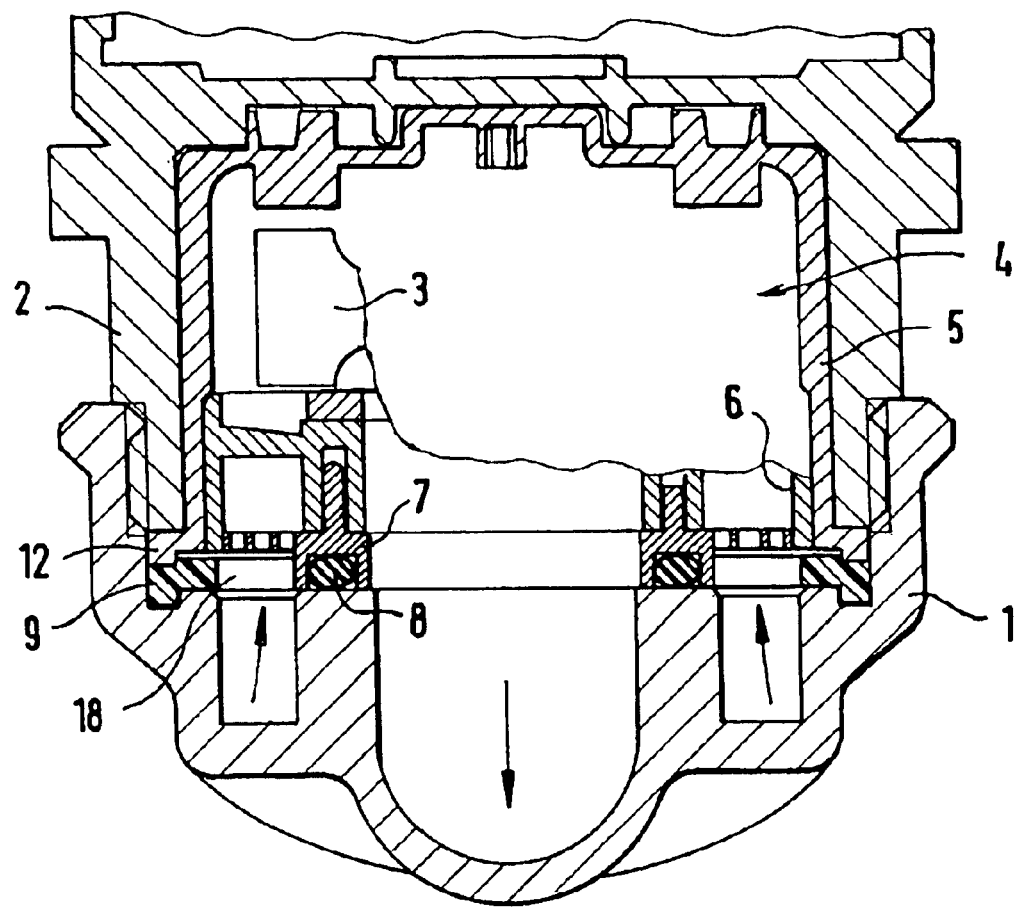
FIG. 1 shows a section through an inventive water meter.

The inventive water meter comprises a metal housing 2 which can be screwed on to a metallic, water-conducting connecting housing 1 and on which an evaluating unit/display unit (mechanical drum counter mechanism or electric counter), the details of which are not shown, is seated. Within the metal housing 2 there is a measurement insert 4 of plastic, which comprises an impeller 3, a channel ring upper part 5, a channel ring lower part 6 which is pushed into the channel ring upper part 5, a screen 7 and two gaskets in the form of an O-ring gasket 8 and a flat gasket 9.

Pursuant to the invention, the metal housing 2 is not seated on the flat gasket 9 forming a seal and does not press the measurement insert 4 over the gasket 8 tightly onto the sealing surface 11 surrounding the outlet opening 10 of the connecting housing 1. Instead and pursuant to the invention, the channel ring upper part 5 is provided with a contacting-pressure edge flange 12 which protrudes radially to the outside beyond the measurement insert 4 and on which a lower edge 13 of a screw-thread section 14 of the metal housing 2 is seated. Accordingly, the metal housing 2, upon being screwed onto the inner thread 15 of the connecting housing 1, presses the measurement insert 4 against both gaskets 8 and 9. The water, rising upward in the outer space of the connecting housing and arriving over the inlet connecting piece 16 of the connecting housing, passes through the screen and is forced into the measurement capsule, from where it passes over the outlet opening 10 to the outlet connecting piece 17 without having any contact whatsoever with the metal housing 2.

The invention is not limited to the example shown. In particular, it would also be possible to provide a different way of exerting pressure by the metal housing 2 on the measurement insert 4 instead of the radially protruding edge flange 12 which is shown. What matters here is that the measurement insert, consisting of plastic, presses directly on the gasket surrounding the inlet opening 18 and forms a seal without water being able to come into contact with the metal housing 2.

What is claimed is:

1. A water meter comprising a metal housing which is connectable with a connecting housing through which the water passes and which is disposed in a water pipeline, a plastic measurement insert comprising a channel ring upper part, a channel ring lower part and an unpeller mounted therebetween, the metal housing pressing the plastic measurement insert onto an outlet opening of the connecting housing, said plastic measurement insert being seated with its lower edge on a gasket on an inlet opening of the connecting housing and which surrounding the connecting housing to thereby form a seal.

2. The water meter of claim 1, wherein the channel ring upper part is provided with an outwardly directed contacting-pressure edge flange which contacts an edge of the metal housing from below.

3. The water meter of claim 1, wherein the gasket surrounding the inlet opening has at least one flat portion.

4. The water meter of claim 2 wherein the gasket surrounding the inlet opening has at least one flat portion.

5. The water meter of claim 1 wherein said connecting housing has a groove in which said at least one flat portion of said gasket is accommodated.

6. The water meter of claim 1 further comprising a screen between said channel ring lower part and said connecting housing, and a seal member between said channel ring lower part and said connecting housing.

7. The water meter of claim 6 wherein said seal member has an arcuate cross-sectional configuration.

* * * * *